United States Patent
Ho

(10) Patent No.: US 6,648,135 B2
(45) Date of Patent: Nov. 18, 2003

(54) DISK STORAGE HOLDER

(75) Inventor: Heiyin Ho, deceased, late of Hong Kong (CN), by Yim Kuk Leung, legal representative

(73) Assignee: Wing Shing Optical Disc Co., Ltd., Chaiwan (HK)

( * ) Notice: Subject to any disclaimer, the term of this patent is extended or adjusted under 35 U.S.C. 154(b) by 0 days.

(21) Appl. No.: 09/897,488

(22) Filed: Jul. 2, 2001

(65) Prior Publication Data

US 2002/0040857 A1 Apr. 11, 2002

(30) Foreign Application Priority Data

Jul. 5, 2000 (CN) .......................................... 00104122 A

(51) Int. Cl.$^7$ ............................................... B65D 85/57
(52) U.S. Cl. ..................... 206/308.1; 206/310; 206/493
(58) Field of Search ....................... 206/308.1, 309–313, 206/493

(56) References Cited

U.S. PATENT DOCUMENTS

| | | | | |
|---|---|---|---|---|
| 5,944,181 A | * | 8/1999 | Lau | 206/308.1 |
| 5,988,375 A | * | 11/1999 | Chang | 206/308.1 |
| 6,065,594 A | * | 5/2000 | Sankey et al. | 206/310 |
| 6,196,384 B1 | * | 3/2001 | Belden, Jr. | 206/308.1 |
| 6,206,186 B1 | * | 3/2001 | Cerda-Vilaplana et al. | 206/308.1 |
| 6,311,835 B1 | * | 11/2001 | Okuhara et al. | 206/308.1 |

* cited by examiner

*Primary Examiner*—Shian Luong
(74) *Attorney, Agent, or Firm*—Pennie & Edmonds LLP

(57) ABSTRACT

The present invention relates to a disk storage holder having a cover member, a base member, and a part connecting the cover member and the base member. According to the present invention, a press-button assembly is provided on the base member. The press-button assembly can have at least one first resilient component extending from the base member and towards a center thereof. The first resilient component can have a press-button located near the center and a protrusion located on a radial outward part the press-button for clasping and securing the disk in the storage holder. The press-button assembly can also have at least one second resilient component positioned on the base member. The second resilient component can be formed to support the disk in the storage holder, to keep the disk in a stable manner, and/or prevent the disk from rotation.

16 Claims, 4 Drawing Sheets

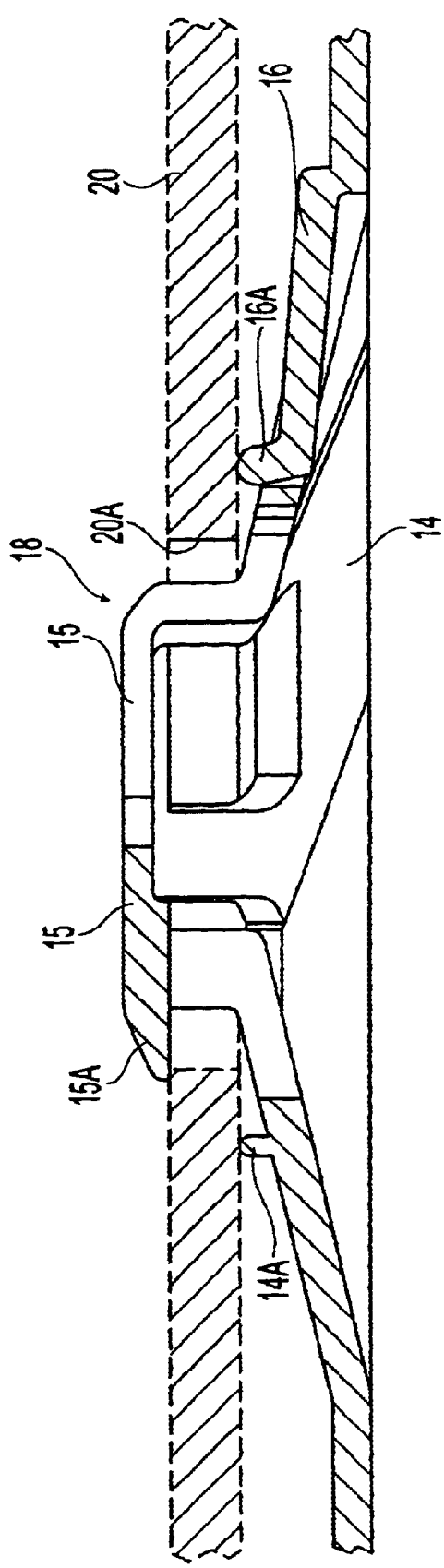
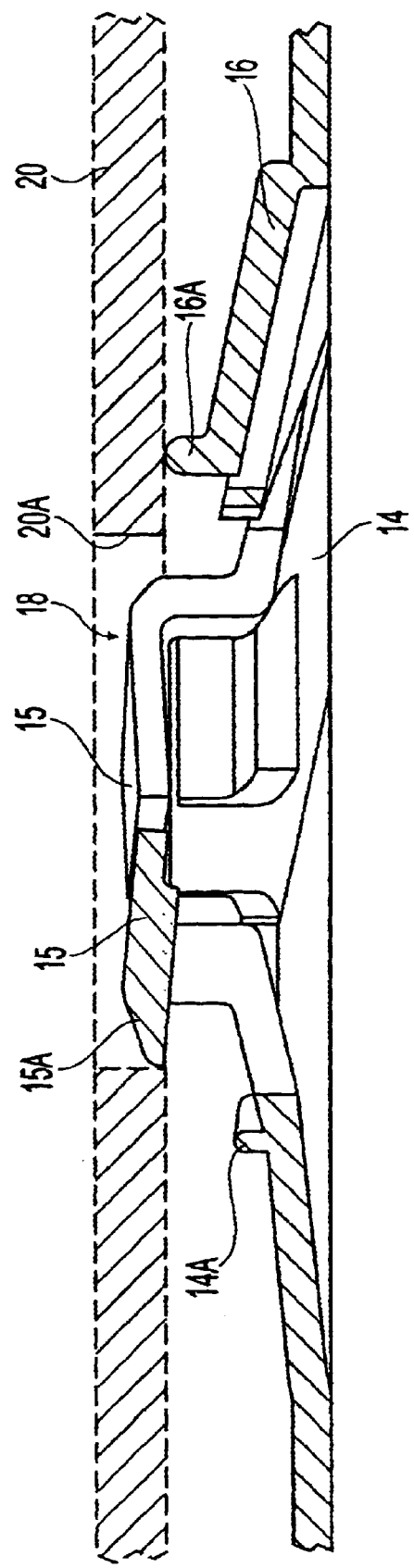
Fig. 4A
Fig. 4B

DISK STORAGE HOLDER

FIELD OF THE INVENTION

The present invention relates generally to a disk storage holder. More particularly, the present invention relates to a digital laser disk storage holder with an improved press-button assembly.

BACKGROUND OF THE INVENTION

A conventional digital laser storage case, as shown in FIG. 1, mainly comprises a cover portion 11', a base portion 12', and a part 13' connecting the cover portion to the base portion. Two molded elastic clamps 11A' are provided inside the cover portion for holding a printing matter stored in the case. A molded ring protrusion 12A' is provided on the base portion for protecting a digital laser disk, which is located in another ring protrusion 12C' inside the ring protrusion 12A', from being squished by the printing matter stored in the case. When the case is closed, two small protrusions 11B' on the rim of the cover portion are snap fitted into two hollows 12B' on the rim of the base portion.

In the center of the base portion, a press-button portion 15' is provided to fasten the digital laser disk stored in the case. The press-button portion 15' is composed of two inwardly extending resilient components 14' to fasten a digital laser disk. But the conventional digital laser storage case is unable to hold the disk securely. Even when additional vertical crescent plastic parts 17' are provided on the ring protrusion 12C' to assist in fastening the laser disk, there still exists space allowing the laser disk to rotate freely after it is fastened, which can damage the disk easily.

Moreover, when removing the disk from the storage case, the user must first press the press-button 15' to loosen the disk a little. The pressure exerted on the press-button, however, does not automatically eject the disk, but only loosen the same a bit. In addition, the retention of the crescent plastic parts makes it more difficult to remove the disk from the case. Consequently, at the same time of pressing the press-button, the user must lift the edge of the disk by hand to succeed in releasing the disk. If the action is improper, the edge of the disk can be easily damaged.

Therefore, it is desirable to provide an improved digital laser disk storage holder that can solve the above problems. It is also desirable to provide a digital laser disk storage holder that can store a disk reliably, prevent a stored disk from rotating, and allow easy and safe removal of the stored disk. The present invention provides such an improved digital laser disk storage holder.

SUMMARY OF THE INVENTION

The present invention relates generally to a disk storage holder. The disk storage holder according to the present invention can comprise a cover member, a base member, and a joining part connecting the cover and base member. Additional fasteners can be provided to retain the cover and base members in a closed position. Various support members can be provided on the base member for supporting a disk in the storage holder.

According to the present invention, a press-button assembly is provided on the base member. The press-button assembly can comprise at least one first resilient component extending from the base member and towards a center thereof. The first resilient component can comprise a press-button located near the center. The press-button can have a protrusion located on a radial outward part thereof for clasping and securing the disk in the storage holder. Optionally, an additional protrusion can be provided on the first resilient component and further away from center for supporting the disk.

Additionally or alternatively, the press-button assembly can comprise at least one second resilient component positioned on the base member. The second resilient component can be formed to support the disk in the storage holder, to keep the disk in a stable manner, and/or prevent the disk from rotation.

The disk storage holder formed according to the present invention can securely hold the disk inside the storage holder to prevent the disk from inadvertent rotation. Additionally or alternatively, the disk storage holder can facilitate the removal of the disk from the storage holder without damaging the disk.

BRIEF DESCRIPTION OF THE DRAWINGS

The structure, usage, and advantages of the embodiments of the invention will be described in detail with reference to the accompanying drawings, in which:

FIGS. 4A and 4B are side cross-sectional views of the press-button assembly of FIG. 3 when a disk is securely held in the storage holder. FIG. 4A shows that the disk is securely clasped in the press-button assembly. FIG. 4B shows that the disk is removed from the press-button assembly when the press-button is pressed.

DETAILED DESCRIPTION OF THE INVENTION

Exemplary disk storage holders embodying the principles of the present invention are shown throughout the drawings and will now be described in detail. In the following description of various embodiments of disk storage holders, similar elements or components thereof are designated with reference numbers having the same last two digits; redundant description is omitted.

Figure 1:
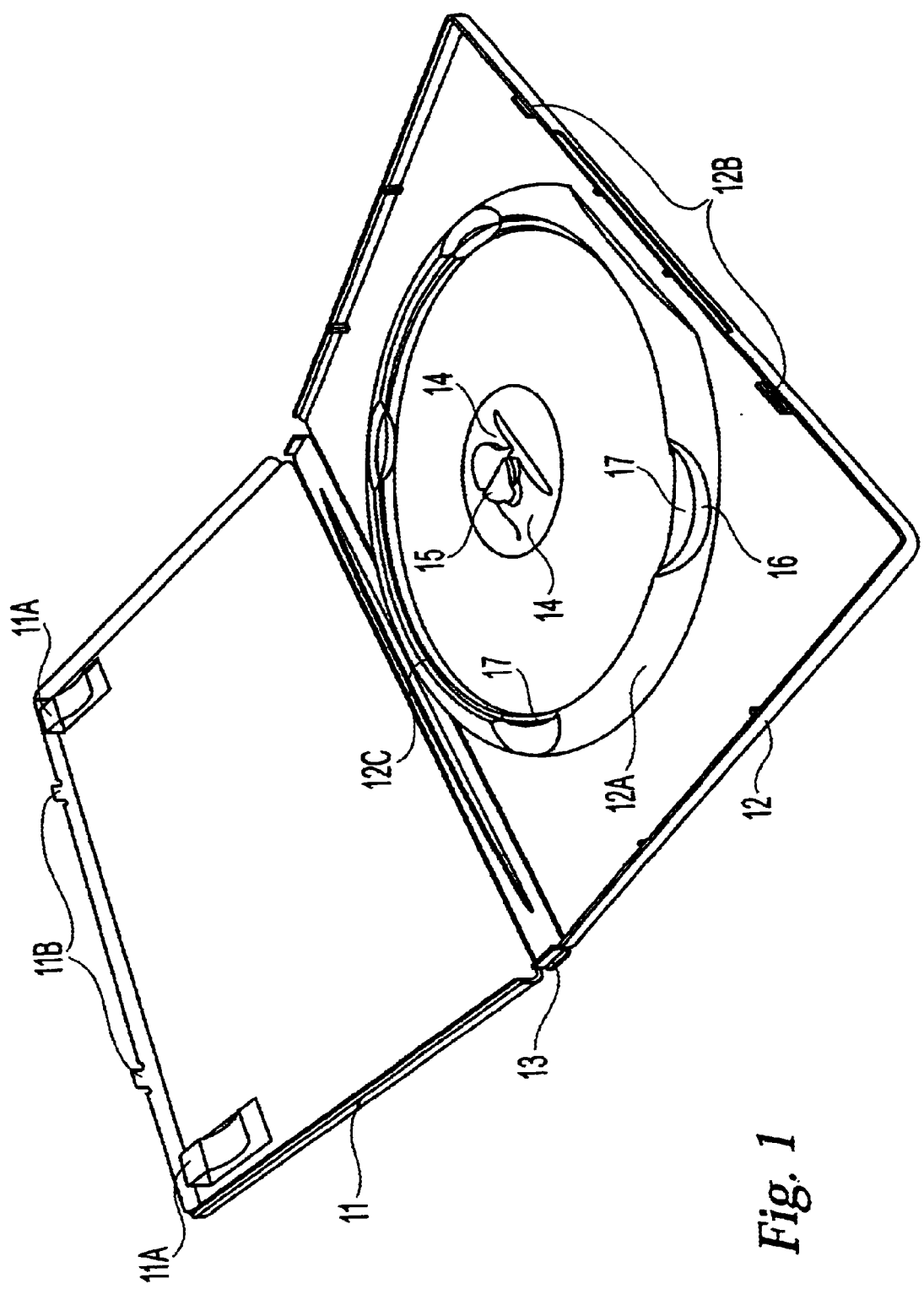
FIG. 1 is a perspective view of a disk storage case having a conventional press-button.
Figure 2:
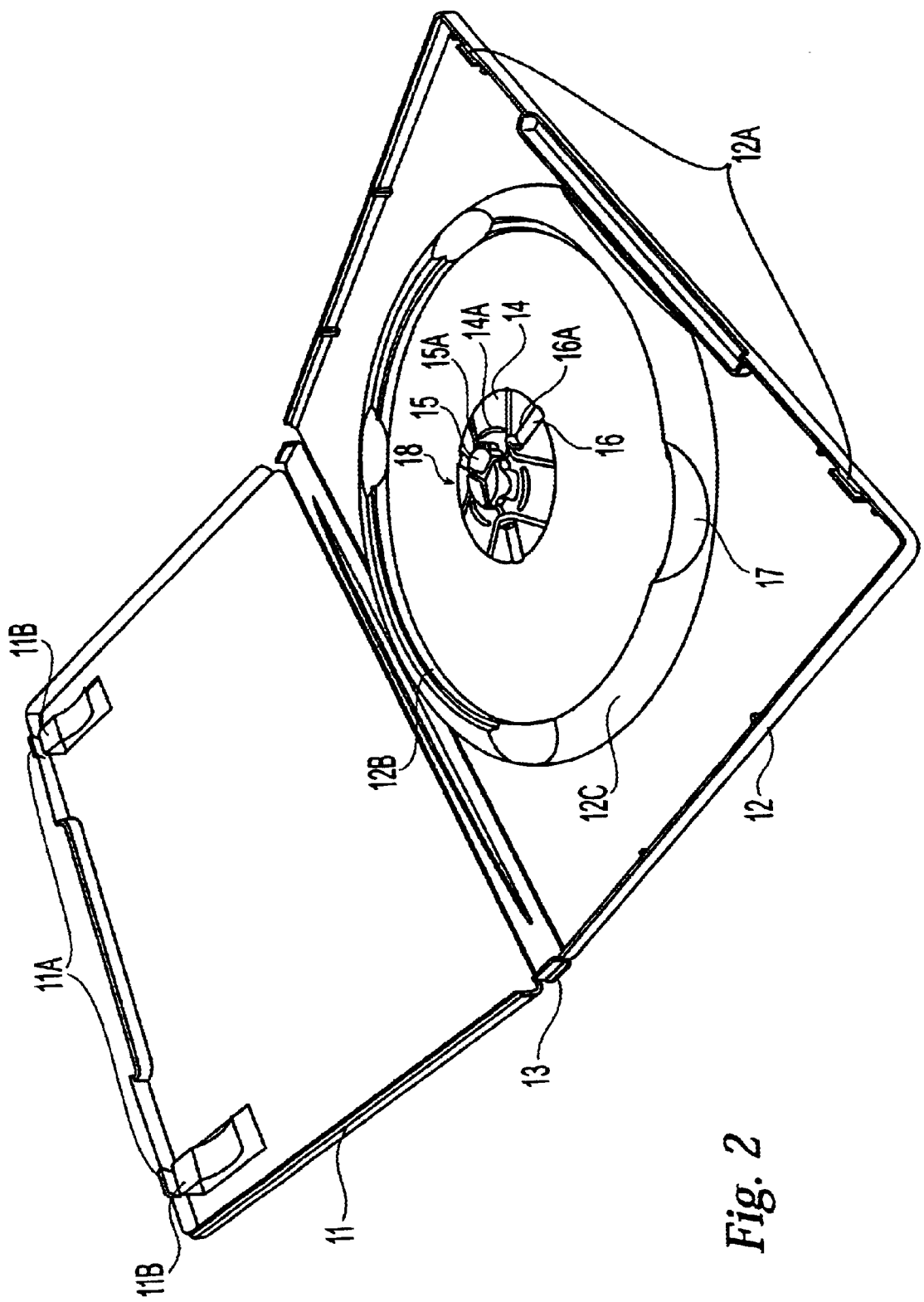
FIG. 2 is a perspective view of a disk storage holder formed in accordance with the principles of the present invention.

FIGS. 2, 3, 4A, and 4B show an exemplary disk storage holder 10 formed in accordance with the principles of the present invention. As shown in FIG. 2, the storage holder 10 comprises a cover member 11, a base member 12, and a joining part 13 connecting the cover member 11 to the base member 12. Various closure members can be provided on the cover and base members 11 and 12 to secure the closure of the storage holder 10. In one embodiment, complementary fasteners 11A and 12A, such as snap closure elements, can be provided on the rim members of the cover and base members 11 and 12, respectively. Accordingly, when the storage holder 20 is closed, the fasteners 11A and 12A can engage with each other to retain the storage holder 20 in the closed position. Optionally, a clamp element 11B can be provided on the cover member 11 for holding a printing matter stored in the storage holder 10. In one embodiment, the clamp element 11B can comprise a pair elastic clamps molded from a plastic material.

Figure 3:
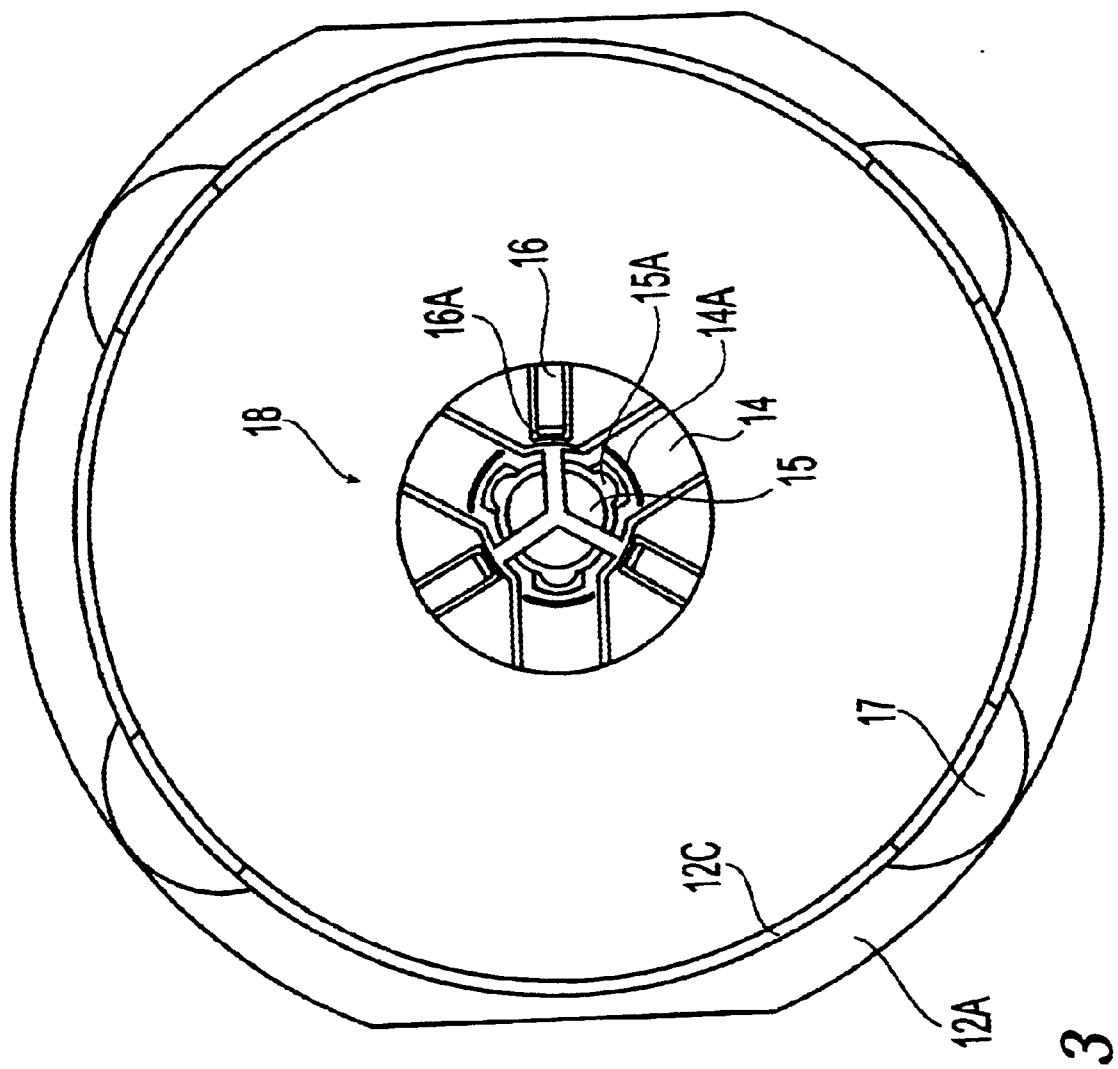
FIG. 3 is a top view of the ring protrusion and the press-button assembly of the storage holder of FIG. 2.

On the base member 12, as shown in FIGS. 2 and 3, a first support member 12B can be formed by various processes, such as a molding process. The support member 12B can be elevated from the base member 12 to support a disk 20 in various manners. For example, the disk 20 can rest on the first support member 12B when the disk 20 is stored in the holder 20. In an exemplary embodiment, such as shown in FIG. 2, the first support member 12B can be formed as at least a partial ring protrusion to hold, such as the edge member of the disk 20. It will be appreciated that other embodiments of the first support member 12B are also within the scope of the present invention.

Optionally, a second support member 12C can be formed on the base member 12 and protrude further away therefrom than the first support member 12B, as shown in FIG. 3. When the disk 20 rests on the first support member 12B, the second support member 12C can thus protect the disk 20 from being squished by the printing matter stored in the storage holder 20. In one embodiment, the second support member 12C cart assume at least a partial ring shape to protect the edge of the disk 20. Additionally or alternatively, the support member 12C can define at least one recess 17 thereon to facilitate the access to the edge of the disk 20. In one embodiment, the recess 17 can be contoured to conform to a user's fingertip. It will be appreciated, however, that the second support member 12C is not essential, but rather optional, for the purpose of the present invention.

According to the present invention, the storage holder 10 can comprise a press-button assembly 18 provided on the base member 12, such as in the center member thereof. The press-button assembly 18 of the present invention can be formed in various manners to, such as provide additional support to the disk 20, secure the disk 20 in a stable position, prevent the disk 20 from undesired rotation, and facilitate the removal of the disk 20 from the storage holder 10 as will be described in greater detail below.

The press-button assembly 18 can comprise at least one first resilient component 14 supported on the base member 12. The first resilient component 14 has a free end extending away from the base member 12. The free end of the first resilient component 14 can be capable of moving in a direction substantially perpendicular to that of the base member 12 upon the application and/or removal of a deforming force. In another embodiment, the first resilient component 14 can comprise a strip-shaped element having its free end movable towards or away from a center member of the press-button assembly 18.

In another embodiment, a plurality of first resilient components 14 can be formed on the base member 12. The free ends of the resilient components 14 are preferably spaced away from one another to allow the free ends to freely move downwardly and towards one another. In an exemplary embodiment of FIG. 2, the first resilient components 14 can be evenly, circumferentially spaced. It will be appreciated that other embodiments of the first resilient component 14 are also within the scope of the present invention.

A press-button 15 can be formed on the first resilient component 14 near its free end to assist in retaining the disk 20 in a secured position inside the storage holder 10. In one embodiment, the press-button 15 can be elevated from the free end of the first resilient component 14 so that the press-button 15 can pass through the central hole 20A on the disk 20 when the disk 20 is held in the storage holder 20, as shown in FIG. 4A.

The press-button 15 can comprise a protrusion 15A extending radially, outwardly from the press-button 15 for retaining the disk 20 inside the storage holder 10. As shown in FIG. 4A, the protrusion 15A can be formed to extend over a portion of the disk 20 to thus prevent the same from inadvertently falling out from the storage holder 10. In one embodiment, the protrusion 15A can be formed to directly contact the upper surface of the disk 20 when the same rests on the first support member 12B so that the disk 20 is held between the protrusion 15A and the first support member 12B. In another embodiment, the protrusion 15A can further apply a retaining force on the disk 20 because of the resilience of the first resilient component 14. Thereby, the protrusion 15A can assist in securing the disk 20 and/or prevent the same from any inadvertent vertical movement. It will be appreciated that other embodiments of the press-button 15 and/or the protrusion 15A are also within the scope of the present invention.

Additionally or alternatively, a second protrusion 14A can be provided on the first resilient component 14 to support the disk 20 in addition to that from the first support member 12A. In one embodiment, the protrusion 14A can be located further away from the center portion. The protrusion 14A can have such an elevated position that the disk 20 can rest on the protrusion 14A when the disk 20 is held in the storage holder 10. In an exemplary embodiment, such as shown in FIG. 3, the protrusion 14A can be a curved bar member provided on the first resilient component 14. It will be appreciated that other embodiments of the protrusion 14A are also within the scope of the present invention.

According to a separate, independent aspect of the present invention, the press-button assembly 18 can comprise at least one second resilient component 16. Similar to the first resilient component 14, the second resilient component 16 can extend from the base member 12 and have a free end extending away from the base member 12. The free end of resilient component 16 is capable of moving substantially perpendicular thereto upon the application and/or removal of a deforming force. In one embodiment, the second resilient component 16 can be formed so that its free end is forced towards the base member 12 by the disk 20 when the same is secured in the storage holder 10 by the protrusion 15A. The second resilient component 16 can thus, through its free end, provide additional support to the disk 20 and/or keep the same in a stable position and from undesired rotation after the disk 20 is held in the storage holder 10. Optionally, a third protrusion 16A can be formed on the free end of the resilient component 16 for supporting and retaining the disk 20.

Additionally or alternatively, the second resilient component 16 can facilitate in releasing the disk 20 from the storage holder 10. In an exemplary embodiment, such as shown in FIG. 4B, the free end of the resilient component 16 can exert an upward force on the disk 20. Accordingly, the resilient component 16 can eject the disk 20 from the storage holder 10 once the clamping action from the first protrusion 15A is removed as will be described in greater detail later.

The second resilient component 16 can be formed in various manners and still afford the above functions. In one embodiment, the free end of the resilient component 16 can extend toward the center of the press-button assembly 18. Optionally, the resilient component 16 can have a strip-shape, such as shown in FIGS. 2 and 3. In another embodiment, a plurality of resilient components 16 can be formed on the base member 12. In an exemplary embodiment, such as shown in FIG. 3, the resilient components 16 can be evenly, circumferentially spaced on the base member. In another exemplary embodiment, such as shown in FIGS. 2 and 3, the first and second resilient components 14 and 16 can be interlaced with one another circumferentially. It will be appreciated that other embodiments of the second resilient component 16 are also within the scope of the present invention.

Exemplary manners of using the storage holder 10 of the present invention will now be described. FIG. 4A shows that the disk 20 is securely held in an exemplary storage holder 10 of the present invention. The disk 20 can define a central hole 20A to be fitted onto the press-button assembly 18. In an embodiment where the press-button assembly 18 assumes a substantial circular shape, the central hole 20A can have a diameter slightly smaller than the external diameter of the press-button assembly 18.

To secure the disk 20 in the storage holder 10, the central hole 20A on the disk 20 can be mounted onto the press-button 15. For example, the central hole 20A can be made to slip downwardly to pass the protrusion 15A on the press-button 15. In one embodiment, the protrusion 15A can have a slant portion, which can facilitate the receipt of the central hole 20A and align the same with the press-button 15. When the press-button 15 is pressed, it moves downwardly and towards the center of the press-button assembly 18. As a result, the central hole 20A on the disk 20 can slip past the protrusion 15A and on and over the press-button 15.

Once the central hole 20A of the disk 20 passes the protrusion 15A, the resilience of the first resilient components 14 forces the press-button 15 to bounce back rapidly to resume the initial position. Consequently, the protrusion 15A on the press-button 15 extends beyond the central hole 20A on the disk 20 and clamps the same. In one embodiment, such as shown in FIG. 4A, the disk 20 is securely held in a position between the protrusion 15A and the protrusion 14A.

To remove the disk 20 from the storage holder 20, the clamping action on the disk 20 is to be removed first. In one embodiment, such as shown in FIG. 4B, the press button 15 can be pressed. When the press-button 15 moves downwardly, the press-button 15 and the protrusion 15A move into the central hole 20A on the disk 20 and/or toward the center of the press-button assembly 18. As a result, the clamping action exerted by the protrusion 15A on the disk 20 is released. The disk 20 can then be easily removed from the storage holder 10, such as by pushing the edge of the disk 20. In one embodiment, the user can easily access the edge of the disk 20, such as from any of the recesses 17 on the first support member 12B to dislodge the disk 20. In another embodiment, the disk 20 can be lifted automatically by the second resilient component 16 through its free end or protrusion 16A so that the central hole 20A on the disk 20 can pass through the press-button 15 and the protrusion 15A.

In view of the above, the disk storage holder of the present invention is capable of solving the various problems existed in conventional disk storage cases, such as the failure to secure a disk in the storage case, the difficulty in removing the disk from the storage case, and the tendency to damage disk.

It will be appreciated that the various features described herein may be used singly or in any combination thereof. Therefore, the present invention is not limited to only the embodiments specifically described herein. While the foregoing description and drawings represent a preferred embodiment of the present invention, it will be understood that various additions, modifications, and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. The presently disclosed embodiment is therefore to be considered in all respects as illustrative and not restrictive, the scope of the invention being indicated by the appended claims, and not limited to the foregoing description.

What is claimed is:

1. A disk storage holder comprising:
   first and second housing members joined to each other and movable between an open position and a closed position; and
   a press-button assembly provided on the first housing member for securing a disk inside the storage holder, the press-button assembly comprising:
      a plurality of first resilient components having their first ends extending from the first housing member and spaced in a circumferential manner and their second ends freely extending towards a center portion of the press-button assembly, each first resilient component comprising a press-button at its free end, a first protrusion extending radially outwardly from the press-button, and a second protrusion provided on the first resilient component to support the disk from underneath; and
      a plurality of second resilient components having their first ends extending from the first housing member and being spaced in a circumferential manner and their second ends freely extending away from the first housing member;
   wherein, when the disk is mounted onto the press-button assembly, the first protrusions on the first resilient components extend over a portion of the disk for clasping the disk while the free ends on the second resilient components bias the disk toward the first protrusions;
   whereby the disk is retained in a stable and non-rotating manner inside the storage holder.

2. The digital laser storage holder of claim 1 further comprising a first support member elevated from the first housing member for supporting the disk, the first protrusion biasing the disk against the first support member.

3. The digital laser storage holder of claim 2 further comprising a second support member elevated from the first housing member and above the first support member for protecting the disk.

4. The digital laser storage holder of claim 3 further comprising at least one recess provided on the first and second support members to facilitate the access of the disk when removing the same.

5. A disk storage holder comprising:
   a housing member for enclosing a disk;
   a support member provided on the housing member to support the disk; and
   a press-button assembly provided on the housing member for movably securing the disk inside the housing member, the press-button assembly comprising:
      at least one first resilient component having a first end extending from the housing member and a free end extending away from the housing member;
      a press-button provided on the free end of the first resilient component;

a first protrusion extending radially and away from the press-button; and a second protrusion provided on the first resilient component for supporting the disk from underneath;

wherein, when the disk is mounted onto the press-button assembly, the first protrusion extends over a portion of the disk and biases the disk against the support member, whereby the disk is retained inside the housing member in a stable arid non-rotating manner.

6. The digital laser storage holder of claim 5 further comprising a second resilient component, the second resilient component having a first end extending from the housing member and a free end extending away from the housing member, wherein, when the disk is mounted onto the press-button assembly, the second resilient component biases the disk against the first protrusion.

7. The digital laser storage holder of claim 6, wherein the second protrusion is a circular bar member.

8. The digital laser storage holder of claim 5, wherein the support member comprises a first support element, on which the disk rests, and a second support element protruding above the first support element for protecting the disk.

9. A disk storage holder comprising a housing member for enclosing a disk and a press-button assembly provided on the housing member for securing the disk, the press-button assembly comprising:

at least one first resilient component extending from the housing member and comprising a free end extending towards a center portion of the press-button assembly, the first resilient component comprising a press-button provided at its free end, a first protrusion extending radially from the press-button and away from the center portion for clasping the disk after the disk is mounted on the press-button assembly, and a second protrusion provided on the first resilient component to support the disk from underneath; and at least one second resilient component having one end mounted on the housing member and the other end extending towards the center portion, the free end of the second resilient component biasing the disk toward the first protrusion so as to retain the disk in a stable and non-rotating manner.

10. The digital laser storage holder of claim 9, wherein the first resilient component is a sheet member.

11. The digital laser storage holder of claim 9, wherein the second protrusion comprises a circular bar element.

12. The digital laser storage holder of claim 9, wherein the free end on the second resilient component comprises a third protrusion extending upwardly.

13. The digital laser storage holder of claim 9, wherein the second resilient component comprises a strip-shaped element.

14. The digital laser storage holder of claim 9 further comprising a support member elevated from the housing member for supporting the disk from underneath, the first protrusion on the first resilient component biasing the disk against the support member.

15. A disk storage holder comprising:

a cover member;

a base member joined to the cover member;

a support member provided on the base member for holding a disk; and a press-button assembly provided on the base member, the press-button assembly comprising:

three circumferentially spaced first resilient components extending towards a center portion of the press-button assembly, each resilient component comprising a press-button located near the center portion, a first protrusion extending radially from the press-button and away from the center portion for clasping the disk after the disk is mounted on the press-button assembly, a second protrusion provided on the first resilient component to support the disk from underneath; and three second resilient components disposed on the base member in a circumferentially spaced manner and extending towards the center portion, each second resilient component having a free end extending toward the center portion for backing the disk to keep the same in a stable and non-rotating manner.

16. The disk storage holder of claim 15 further comprising at least one recess portion provided on the support member to facilitate access to the disk held in the storage holder when removing the disk therefrom.

* * * * *